Dec. 9, 1958   J. MERCIER ET AL   2,863,422
HYDRAULIC FOLLOW UP SYSTEMS
Original Filed Jan. 14, 1948   6 Sheets-Sheet 1

Jean Mercier
Pierre Guillaume Joseph Marie Audemar
INVENTORS.

BY
Richardson, Davis and Verdon
their ATTORNEYS.

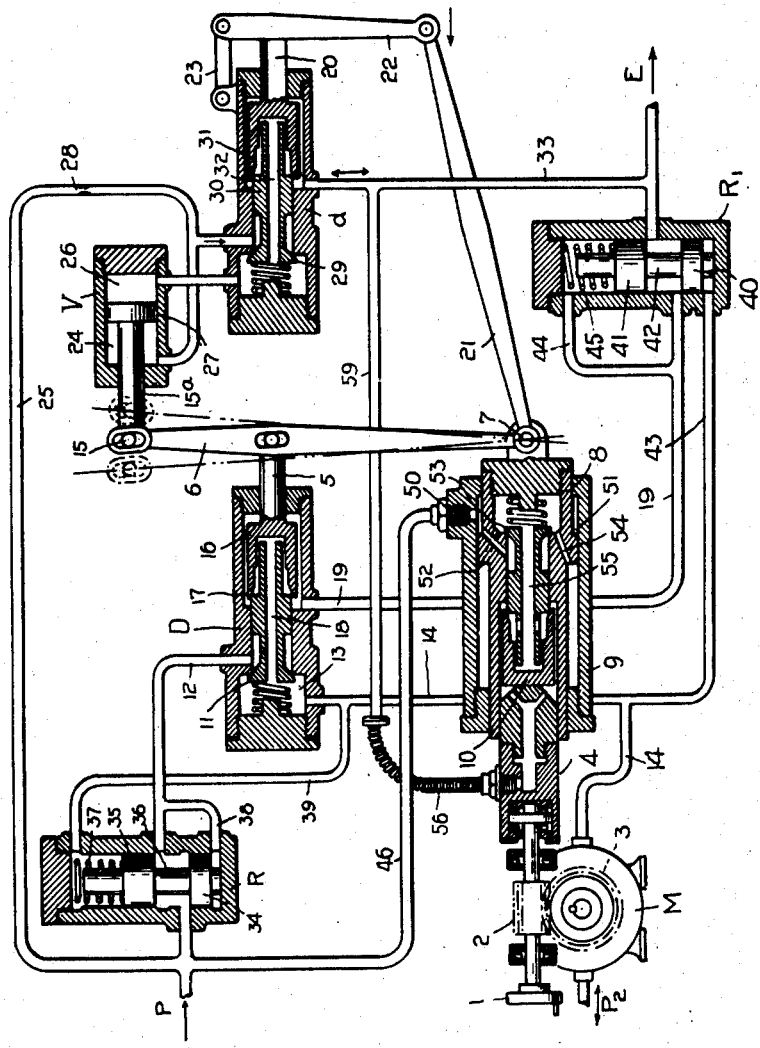

Dec. 9, 1958 J. MERCIER ET AL 2,863,422
HYDRAULIC FOLLOW UP SYSTEMS
Original Filed Jan. 14, 1948 6 Sheets-Sheet 3
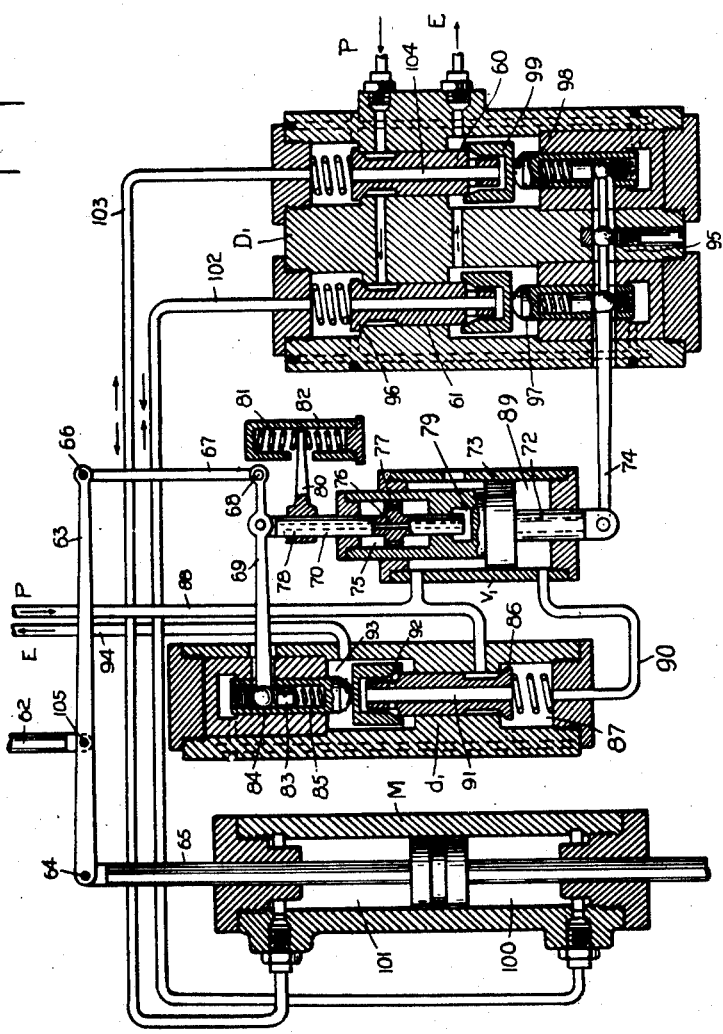
INVENTORS:
Jean Mercier
Pierre Guillaume Joseph Marie Audemar
BY
Richardson, David and Nardon
their ATTORNEYS.

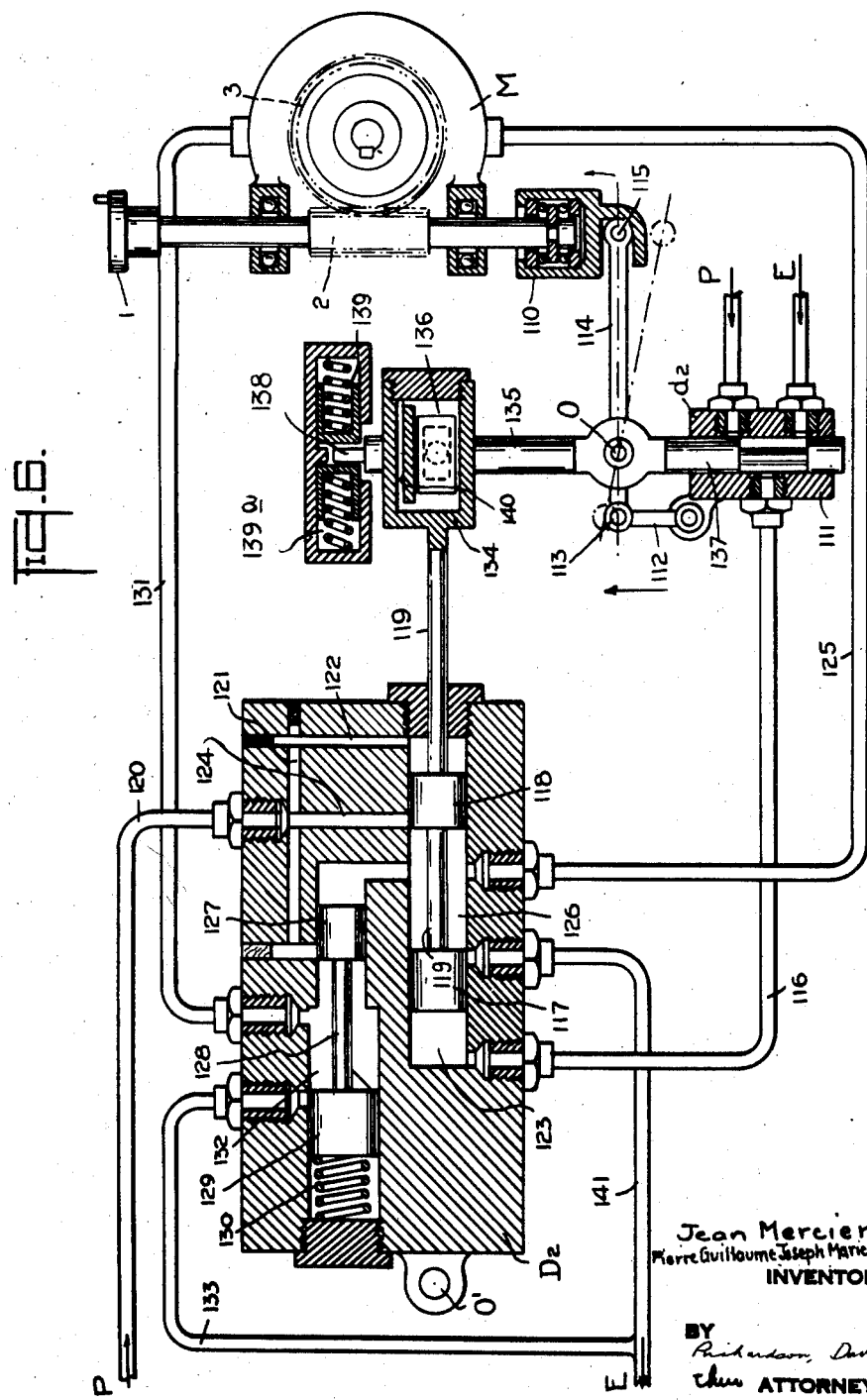

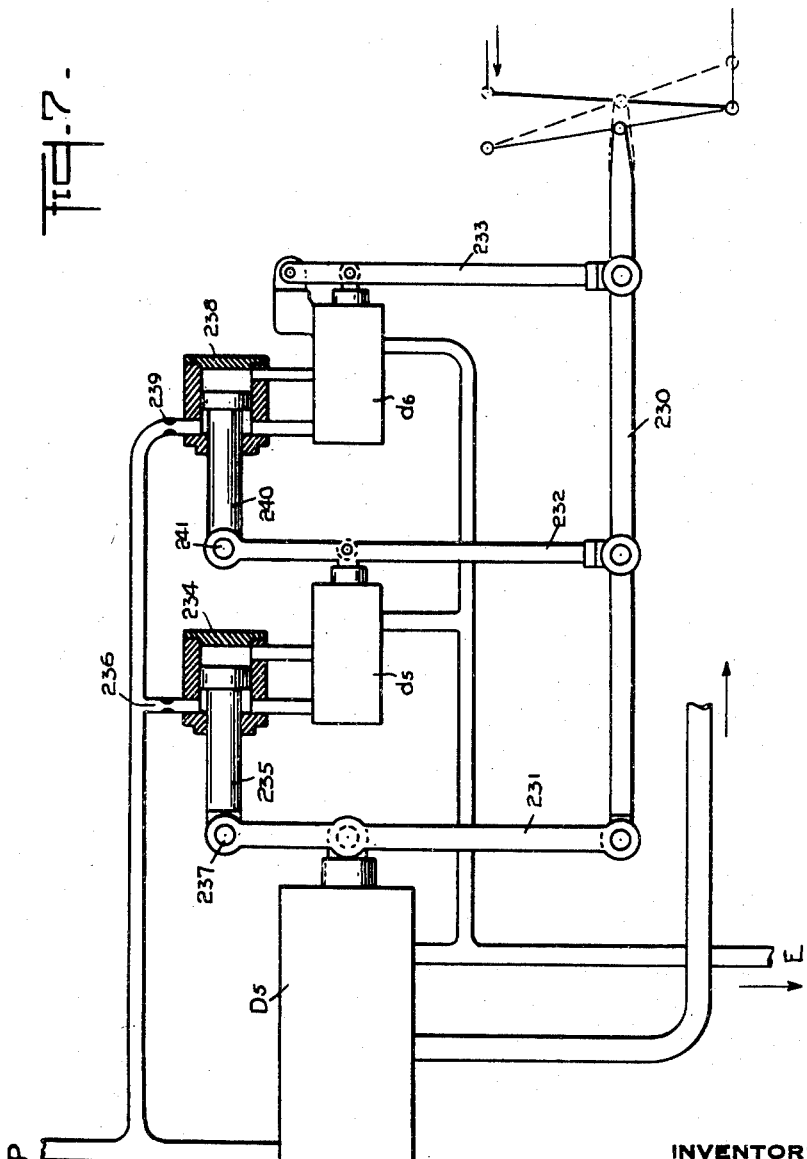

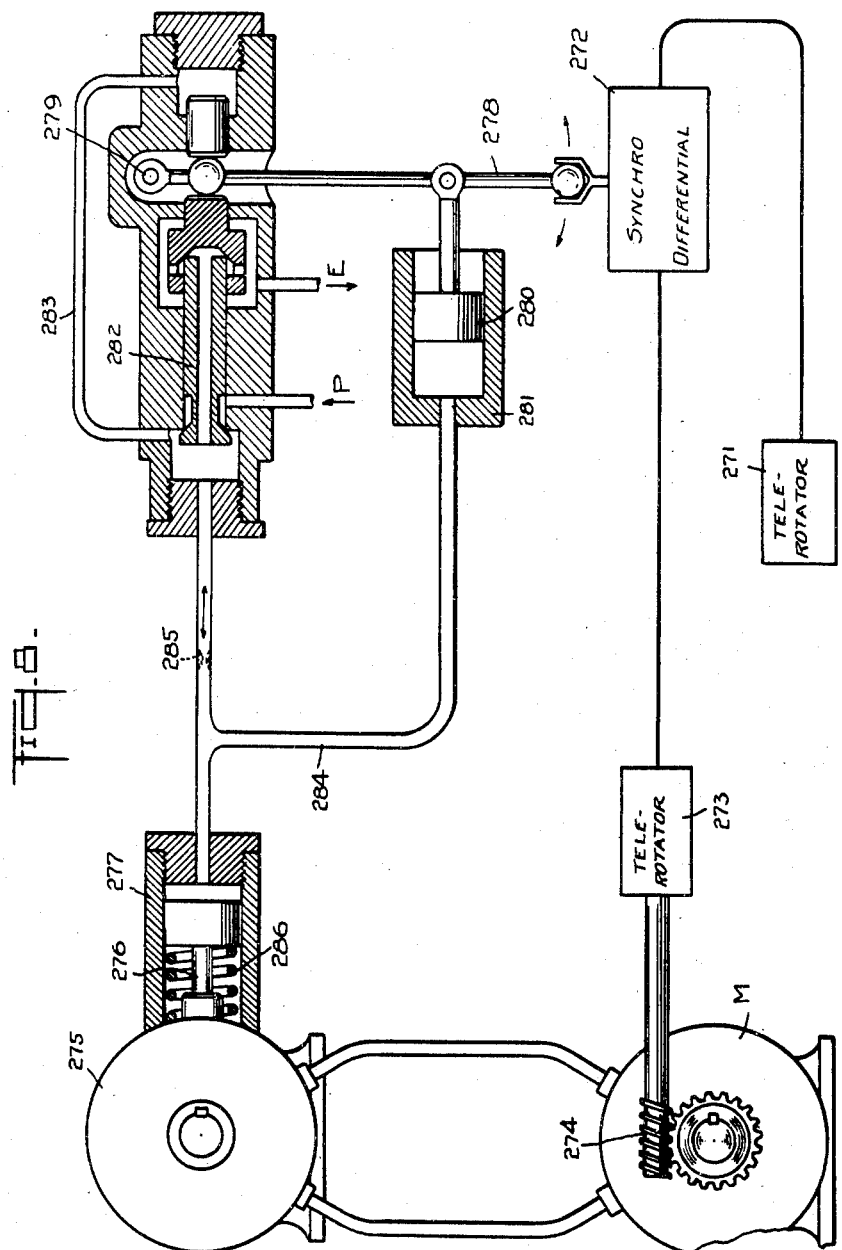

United States Patent Office 2,863,422
Patented Dec. 9, 1958

2,863,422

HYDRAULIC FOLLOW UP SYSTEMS

Jean Mercier, New York, N. Y., and Pierre Guillaume Joseph Marie Audemar, La Garenne-Colombes, France Original application January 14, 1948, Serial No. 2,286, now Patent No. 2,787,255, dated April 2, 1957. Divided and this application February 19, 1954, Serial No. 413,022

Claims priority, application Luxembourg January 22, 1947

2 Claims. (Cl. 121—41)

The present invention relates to hydraulic follow-up systems.

This copending application is a division of our application Serial No. 2,286, filed January 14, 1948, now Patent No. 2,787,255 issued April 2, 1957.

The invention comprises means for causing a hydraulically operated controlled member or servomotor to move a load to a position determined by the movement of a control member, and in moving the load to such position, to follow faithfully the movements of the control member with respect to both speed and acceleration.

An object of the invention is to provide a system of this character in which hunting or flutter effects are positively damped.

Another object of the invention is the provision of pilot valve means and flow rate responsive regulator means included in the follow-up system for the prevention of such hunting effects and for compensating for any changes in the mechanical load driven by the servomotor.

A further object of the invention is the provision of a force amplifier connected between the control member and the hydraulic control valve mechanism of the follow-up system for reducing the mechanical load which would otherwise oppose movement of the control member.

The above specified and other objects, which will appear more clearly as the specification proceeds, are accomplished, according to the present invention, by the arrangement and combination of elements set forth in the following detailed description, defined in the appended claims, and illustratively exemplified in the accompanying drawings in which:

Fig. 4 is a diagram of a hydraulic follow-up system according to the invention showing certain elements in section;

Fig. 5 is a similar diagram of a second embodiment of a hydraulic follow-up system according to the invention;

Fig. 6 is a diagram of a third embodiment;

Fig. 7 is a diagrammatic view of another hydraulic follow-up system showing the connections among the various distributors;

Fig. 8 is a diagram of a further control system according to the invention including a variable flow rate pump as part of the flow rate varying means.

Figure 1:
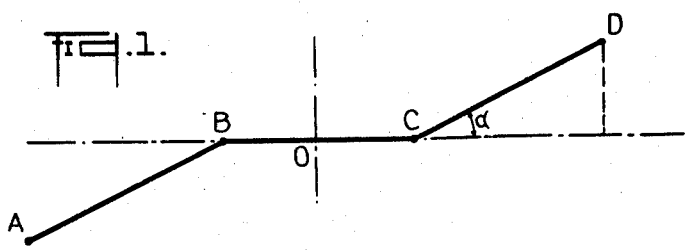
Figs. 1, 2, 3 and 3a are graphs illustrating certain functions of hydraulic follow-up systems.

Referring now to the drawings, and first to Figs. 1 to 3a:

Fig. 1 represents graphically the opening of a hydraulic control valve hereinafter referred to as a distributor as a function of the displacement of its movable part, the former being laid off as ordinate and the latter as abscissa. In this graph, the horizontal zero axis portion BC of the curve corresponds to the overlapping or play necessary to obtain a tight seal, while parts AB and CD represent the gradual opening of the distributor as a function of the stroke or displacement of its movable part. It can be shown that, the smaller the angle $\alpha$ i. e., the more gradually the distributor opens, the smaller will be the flutter or hunting effects. In fact, the variation of the flow rate should be as gradual as possible, in order to produce only gradual variations in the speed of the output or controlled member of the servomotor.

If the mechanical load resistance which the controlled member has to overcome is constant, a predetermined flow rate of pressure fluid, and, therefore, a predetermined speed of displacement of the controlled member corresponds to each opening of the control valve or distributor. On the contrary, if the load resistance presented to the controlled member varies, for a given opening, the flow rate through the distributor varies accordingly and causes variations in the speed of the controlled member.

Figure 2:
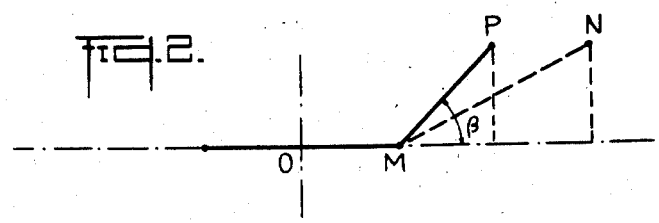

Fig. 2 is a graph which represents the speed of the controlled member in function of the rate of displacement of the movable part of the distributor. It will be seen that the slope of the speed curve, for a constant load resistance on the controlled member, coincides with the corresponding curve for the opening expressed as a function of the stroke (Fig. 1). This curve is represented (Fig. 2) by the straight line MN. On the other hand, if the load resistance presented to the controlled member decreases, it is easy to understand that, for the same control opening, the speed of the controlled member increases. Speed of the output or controlled member as a function of the stroke will then follow the straight line MP of increased slope which forms with the horizontal axis an angle $\beta$ larger than angle $\alpha$. In this case, the curve MP denoting the increase of speed as a function of the stroke of the movable part or control element of the distributor becomes too steep and flutter or hunting effects result.

According to a specific characteristic of the invention, this disadvantage is avoided and, for any given opening of the distributor produced by a predetermined displacement of its control member, a speed of the controlled member independent from the load it has to overcome is obtained, by the provision in the hydraulic system of flow rate regulators, actuated by the pressure drops or differentials within the distributor which directly controls the output servomotor.

These flow rate regulators may be constituted, for instance, by balanced slide-valves, kept normally open by various means, such as springs, and having their opposite ends in communication, respectively, with the up stream and down stream sides of the distributor. If the flow rate of the distributor, at a given opening, tends to increase due to a decrease of load, the pressure difference between the up stream and down stream sides of the distributor also tends to increase and acts on the faces of the slide valve, overcoming the force of the spring. The slide valve closes and prevents the flow rate of the distributor from increasing. Contrarily, if the flow rate tends to decrease due to an increase of load, the difference of pressure between the up stream and down stream sides of the distributor decreases, and the slide valve opens under the action of its spring.

Thus, for any given opening of the distributor which directly controls the output servomotor, the flow rate remains constant and independent from the load the controlled member has to overcome. The flow rate being constant, the speed of the controlled member is also constant. The flow rate regulators may be placed, according to the invention, at the inlet or at the outlet of the distributor, or both at the inlet and at the outlet, in order to respond effectively in both directions of movement of the controlled member.

It is particularly desirable to place one or several regulators in the outlet conduit of the distributor. In fact, where flow rate regulators are arranged in the inlet conduit of the distributor, the danger exists that, on an increase in the flow rate, because of the inertia of the masses in movement, a vacuum may be formed between the flow rate regulator and the controlled member, with the result that the braking action is insufficient.

If, however, the flow rate regulators are disposed in the outlet conduit of the distributor, their action determines, in the above mentioned case, an increase of pressure, and, thus, a more efficient braking.

Figure 3A:
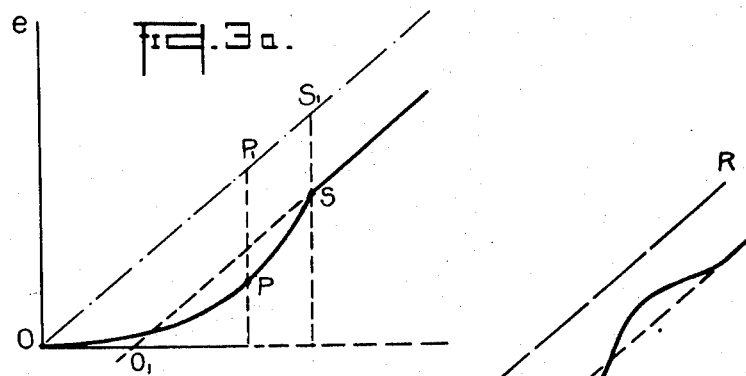
Figure 3:
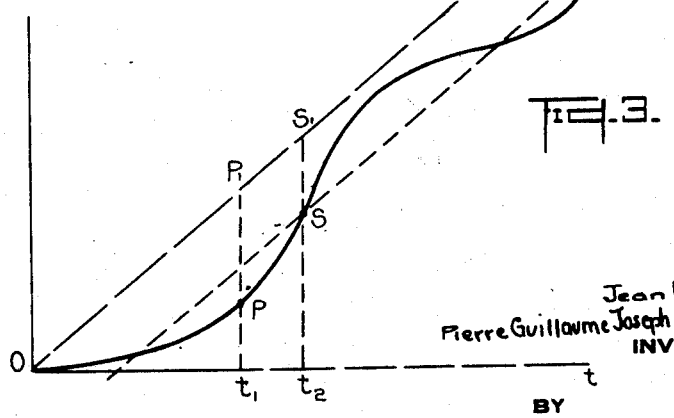

Fig. 3 represents graphically the displacements, both expressed as functions of time, of the control member and controlled member. It is assumed that the control member (without inertia) reaches at once a constant speed, and moves in a uniform way; its graph is represented by the straight line OR.

The controlled member, which has appreciable inertia, undergoes an acceleration which causes it to follow the curve OP. At the time $t_1$, its speed is equal to that of the control member, but the delay between the two movements is $PP_1$ and the distributor opening is proportional to this delay. Since to each opening of the distributor, there corresponds a certain speed of the controlled member, at the time $t_1$ the opening is too great, and the controlled member continues to accelerate. At the time $t_2$, the controlled member arrives at S and the delay is then represented by $SS_1$, this delay being the one resulting from the opening of the distributor for the constant speed corresponding to the displacement of the control member. At this time $t_2$ the speed of the controlled member is greater than that of the control member. The flow rate regulator, according to the invention, prevents at this point S, the speed of the controlled member from being higher than the one determined by the $SS_1$ opening.

Fig. 3a is a graph of the displacements of the control member and controlled member in the case of a circuit including flow rate regulators according to the invention.

Referring to Fig. 3a, it will be understood that the suppression of the delay, according to the first characteristics of the invention, causes the $O_1S$ curve to coincide with the $OS_1$ curve after a very short time in such a way that the curve is straightened out and the resulting straight line is brought in coincidence with the straight line $OS_1$, these two operations taking place practically simultaneously.

Referring now to Fig. 4, 1 is the control member diagrammatically indicated as a handwheel or, more exactly, a reference member driven in any desired manner, and M is the controlled member represented by a reversible hydraulic motor. The rotational displacements of the motor M are controlled in response to control displacements of the reference member 1, as will be described later on. A connection between these two members is effected by a worm 2 cooperating with a worm gear 3 secured to the rotor shaft of the hydraulic motor M. Thus, when control member 1 is rotated, it causes an axial sliding of a hydraulic control member 4 connected with the common shaft of reference member 1 and worm 2 by thrust bearings to permit free rotation of the latter. The axial displacements of member 4 are intended to control a main distributor D which directly controls the servomotor M. This distributor is fed with pressure fluid from a suitable source. P indicates the inlet of the fluid into the system, and in E is the outlet for the spent pressure fluid being back to the tank. Distributor D is, in the example shown, of the type without backlash or lost motion. The movable part 5 or control member of the distributor D is actuated by a connecting rod 6, the lower end of which is pivoted at 7 to a force amplifier differential piston 8 slidable in the cylinder 9. This differential piston, in combination with an auxiliary control valve 10 which in the example shown is of the same type as the main distributor D, constitutes a stress or force multiplier. However, it should be understood that, without departing from the spirit of the invention, the force amplifier could be omitted and the operating member 4 could act directly on point 7. The motor M is fed on its left side with fluid under a pressure $P_2$ equal to half the pressure supplied to the system at P. The right side of the motor can be connected either with full pressure P or with the outlet E. Thus, the motor turns in one direction or in the other, depending upon whether control member 5 of the main distributor D is moved from the right to the left or from the left to the right. Let it be assumed first that the control member 1 is set in motion in the direction causing a displacement of piston 8 from the right to the left. This displacement causes an opening of valve 11 of main distributor D due to the pivoting of lever 6 about its upper fulcrum 15, which, for the time being, is considered as stationary. Valve 11 being thus opened, the pressure fluid passes through the flow rate regulator R, the operation of which will be described later on, and through pipe 12 into chamber 13 of the main distributor D and hence, through pipe 14, to the right side of the motor M, thus producing a clockwise rotation of the latter. As a result, the worm wheel 3 tends to shift the worm 2 and the operating member 4 toward the right, and, consequently, through the action of the force multiplier, the operation of which will be explained later on, pivot point 7 from the left to the right, so that lever 6 restores the control member 5 of the main distributor D to its starting position, thus causing the motor M to stop. If, on the other hand, member 5 is displaced from the left to the right, valve 16 of the main distributor D is removed from its seat 17 and the fluid at half pressure flows from the left side of the motor M through pipe 14, chamber 13, inner passage 18 of the distributor, and pipe 19 towards outlet E, passing through the flow rate regulator $R_1$, the operation of which will be described later on. The motor M, then, turns counter-clockwise and moves lower pivot point 7 of lever 6 from the right to the left, thus restoring control member 5 of the main distributor D to its neutral point and stopping the motor M.

The operation just described supposes that control member 1 has been displaced through a given angle causing exactly proportional displacement of the rotor of motor M. However, as explained above, in some cases, a continuous displacement of the reference member 1 is desired to cause a corresponding displacement of the rotor of motor M at a directly proportional speed without a delay on dephasing between these two members. Such a continuous displacement requires a constant opening of the main distributor D determining a constant flow rate corresponding to the desired speed of the motor. For this purpose, according to the principal feature of the invention, the system is provided with a pilot control valve or distributor $d$, the movable member or control element 20 of which is controlled by a linkage system of connecting rods 21, 22 and 23. Connecting rod 21 is articulated at one of its ends to pivot point 7, so that the displacements of piston 8, while controlling displacements of member 5 of the main distributor D, simultaneously determined corresponding displacements of member 20 of the pilot distributor $d$. The pilot distributor $d$ which, in the example shown, is of the same type as the main distributor D, controls the feeding of a differential cylinder V having two chambers 24, 26 separated by a slidable piston 27. The left hand chamber 24 of the cylinder V is placed under a constant full pressure P by means of pipe 25, and the right side chamber 26 can be connected either to the full inlet pressure or to the outlet E by means of the pilot distributor $d$. If the movable control member 20 of the pilot distributor $d$ is displaced from the right to the left, the valve 29 is removed from its seat and the pressure fluid from pipe 25 is led to chamber 26 of the jack or cylinder 7. If, on the contrary, the movable member 20 of the distributor $d$ is moved from the left to the right, the valve 30 is removed from its seat 31 and the pressure fluid is discharged from chamber 26 through the inner passage 32 of the distributor $d$ and pipe 33. As the active surface of the right side of piston 27 of the cylinder or jack V is greater than the active left side surface of this piston, it will be seen that if pressure is admitted to chamber 26, the piston 27 moves from the right to the left and that, on the contrary, if chamber 26 is connected with the outlet, the piston 27 moves from the left to the right. Each displacement of force amplifier output member 8 will thus tend to produce a corresponding displacement of the piston 27 of jack or cylinder V. However, the displacements of piston 27 in cylinder V take place at a greatly reduced speed, due to the provision of a throttle passage or metering orifice 28 in the feeding pipe 25 of the cylinder V. The displacements of piston 27 produce corresponding displacements of its piston rod 15a to which is pivoted at 15 the upper end of lever 6. If it is assumed that pivot point 7 remains in a given position, the displacements of the upper fulcrum 15 cause displacements of the movable control member 5 of the main distributor D. If member 8 moves quickly with the lower pivot point 7 participating in its movement, the control member 5 of main distributor D is displaced by lever 6 pivoting about the relatively substantially stationary fulcrum 15. If, on the other hand, the fulcrum 15 is shifted under the effect of the movement of piston 27 of jack V, the control member 5 is displaced by a pivoting of lever 6 about point 7. Since the displacements of piston 27 of the jack V are delayed due to the presence of throttle passage 28, it will be seen that piston 27 of cylinder V moves the fulcrum 15 of lever 6 slowly so as to displace the main distributor control member 5 in the same direction in which it had just been moved, and this displacement continues until the pilot distributor d is closed. Thus, motor M is fed at a higher flow rate than that corresponding to the normal opening of distributor D and, consequently, it displaces the pivot point 7 beyond the position to which it would have restored this point 7 for a normal or slow opening of distributor D, the supplemental displacement corresponding to the opening of distributor D caused by the jack V and insuring the rotation of motor M at the desired speed. Thus, it will be seen that, in the new balance position, point 7 remains in the neutral position shown, while distributor D remains open to an extent determining the flow rate corresponding to the desired speed, as lever 6 assumes one or the other of the two symmetrical positions represented by dotted lines in Fig. 4.

Consequently, for any constant displacement speed of the control member and the controlled member, the delay or dephasing between these two members is suppressed.

As just explained, the described arrangement insures the suppression of the delay for any constant rate of displacement of the control member and a corresponding displacement of the controlled member. However, it should be noticed that this constant rate is not instantaneously attained by the controlled member and, even if the rate of displacement of the controlling member is uniform, the controlled member will follow exactly only after a smaller or greater settling interval. During this settling interval, the controlled member undergoes successive accelerations and decelerations about its point of equilibrium (flutter or hunting effects) which may continue for rather extended periods of time. In order to eliminate these hunting or flutter effects, a certain delay between the controlling and the controlled movements must be maintained during the settling interval, as it is this delay which produces the desired gradual increase in speed. To insure a perfect follow-up, on the one hand, the delay must be slowly suppressed, and, on the other hand, the flutter effects must be damped and eliminated as quickly as possible.

According to a specific feature of the invention, the flutter effects are eliminated by means of at least one flow rate regulator placed in the system. The regulator operates to produce, at any given distributor opening of the main distributor D, for any increase in the flow rate of the distributor, a compensatory limitation of the flow, and for any decrease in the flow rate of the distributor a compensatory increase of the flow. In the example shown, two flow rate regulators R and $R_1$ have been provided, one at the inlet P and the other at the outlet E of the system, these regulators being similar and each being constituted by a balanced slide valve. Referring first to regulator R, it can be seen that it includes two pistons 34 and 35 rigidly connected by a rod 36 and constantly biased to a position in which the valve is open by means of a resilient member, such as a spring 37. The space below the piston 34 is placed, through a branch pipe 38, under the pressure existing on the up stream side of the main distributor D, while the space above the piston 35 is subjected, through a branch pipe 39, to the pressure existing on the down stream side of this distributor. If the flow rate through distributor D increases, due, for instance, to a decrease of load on the motor M, the piston assembly 34—35—36 will be moved upwards by the pressure existing below the piston 34 and the regulator will tend to close, thus producing in its turn, a decrease in the flow rate. If, on the contrary, the flow rate through distributor D decreases, due, for instance, to an increase of load on the motor M, the slide valve of regulator R will be displaced towards the open position by the spring 37, and the flow rate will increase.

Similarly, regulator $R_1$ includes two pistons 40 and 41 connected by a rod 42. The space below the piston 40 is subject to the pressure existing on the up stream side of distributor D by means of the branch pipe 43, when the distributor assumes the position permitting the discharge of pressure fluid from the right side of the motor towards the outlet E through the body of the distributor D. The space above the piston 41 of the regulator $R_1$ is placed under the pressure existing at this time on the downstream side of the distributor D by means of pipe 19 and branch pipe 44. Thus, any increase in the flow rate will cause an upward displacement of the whole piston assembly 40, 41, 42 and a greater or smaller reduction of the flow-cross-section of the regulator, and any decrease in the flow rate through distributor D will, on the other hand, cause a downward displacement of the assembly 40, 41, 42 under the action of spring 45. It will be understood that, with this system, flutter or hunting effects in the periods preceding the settling or attaining equilibrium between the speed of the control member and the controlled member are quickly dampened, while the delay is being suppressed by jack V. Thus, the combination of these two devices insures a perfect follow-up when the system operates at constant speeds.

The fulcrum 7 of levers 6 and 21 may be displaced directly, as described above, by the operating member 4. However, according to another feature of the invention, the fulcrum 7 is actuated through a stress or force multiplier. The stress amplifier or multiplier comprises an output piston 8 sliding in a cylinder 9 and fed with pressure fluid by means of a supply pipe 46. The fluid enters the stress multiplier through the inlet port 50 and acts constantly on one face 51 of the piston 8, while another face 52 of larger section of this piston 8 is placed under pressure through a valve 53 when the input or operating member 4 is displaced from the left to the right. On the other hand, the space in cylinder 9 defined by the larger face 52 of piston 8 is connected to the outlet E through the passage 54, the central bore 55 of the distributor, and the pipes 56 and 33, when the input or operating member 4 is displaced in the opposite direction. The amplifier distributor 10 is preferably balanced to respond immediately to any displacement of the input member 4 with a minimum backlash or lost motion. Any displacement, as small as it may be, of the reference or control member 1 and, therefore, of amplifier input or operating member 4, causes an opening in one way or the other of the amplifier distributor 10 and, consequently, a corresponding displacement of piston 8 and pivot point 7. The force amplifier distributor 10 being of the type without backlash, there is no delay in the control of the position of the pivot point 7.

Fig. 5 illustrates a second embodiment of a hydraulic follow-up system according to the invention. In this embodiment, the controlled member is a double acting hydraulic cylinder or jack M, supplied with pressure fluid through a four way main distributor $D_1$ constituted, in the example shown, by a combination of two three-way distributors without backlash 60 and 61. The control or reference member is represented by control rod 62 acting as a connecting lever 63 pivoted at its left hand end at 64 to the upper end of the piston rod 65 of cylinder M. The right hand end 66 of the connecting rod 63 is coupled by means of a link 67, which constitutes the operating member of this device, to the right hand end 68 of a lever 69 pivotally connected intermediate its ends, to the upper end of a stem 70 penetrating slidably into the piston of an auxiliary jack $V_1$. The left hand end 84 of the lever 69 is ball-shaped and fitted in a recess of a piston 83 controlling the movable member of a pilot distributor $d_1$. The rod 72 of the piston 73 of the auxiliary jack $v_1$, is hinged at its lower end to a lever 74 controlling the four way main distributor $D_1$. The system is fed with pressure fluid through port P, the exhaust taking place in E. In the example shown, the feed of the cylinder M, controlled by the main distributor $D_1$ and the feed of the jack $v_1$ controlled by the pilot distributor $d_1$ are represented as separate. It should be understood, however, that both distributors $D_1$ and $d_1$ may be fed from the same source of pressure with or without an expansion valve to reduce the feeding pressure of jack $v_1$.

The stem 70 depending from lever 69 penetrates in a part of the piston 73 formed with a cylindrical oil-filled chamber 75 in which slides an auxiliary piston 76 secured to the stem 70 and bored with at least one passage of small cross-section 77. The stem 70 is provided with an inner passage 78 which serves to connect a second chamber 79 inside the piston 73 with the atmosphere. Thus, the auxiliary piston 76, during its displacements in the piston 73, need overcome only the resistance of the oil in chamber 75 flowing from one side of the auxiliary piston to the other side thereof through one or more passages of small cross-section 77. Near its upper end, the stem 70 carries a projecting arm 80 penetrating between two stationary springs 81 and 82, so that when the stem 70 and the arm 80 are displaced in one or the other direction, one of the springs is compressed and tends to restore the arm 80 and stem 70 back to their normal position, this restoring movement being retarded because of the small cross-section of the passage or passages 77.

The device operates as follows:

Assuming that the control rod or reference member 62 is pulled upwards, lever 63 will pivot about point 64 because of the great resistance of the piston of output cylinder M against displacements. As a result, the operating link 67 will move upwards and the left hand end 84 of lever 69, pivoting about its fulcrum on stem 70, will push the small piston 83 downwards. In order to prevent lost movement, the ball shaped end 84 of lever 69 acts on the piston 83 through a spring 85 housed in this piston. The piston 83 pushes against the movable member of the pilot distributor $d_1$ to remove the valve 86 from its seat, thus connecting the chamber 87 with the pressure pipe 88. The jack $v_1$, which is of the differential type, is constantly supplied with pressure fluid acting on the smaller face of the piston 73 by means of the pipe 88, while the larger face of this piston can be placed either under the same pressure by a downward displacement of the valve 86, as just explained, or under zero pressure by an upward displacement of piston 83 which connects chamber 89 of the jack $V_1$ with the outlet, through a pipe 90 opening into chamber 87 of the distributor, and, hence, through inner passage 91 of this latter, passages 92, chamber 93 and pipe 94.

When chamber 89 is connected with the pressure supply pipe 85, the piston 73 moves upwards and causes lever 74 to pivot about its fixed fulcrum 95. As a result, the valve 96 of the main distributor $D_1$ is lifted off its seat by the piston 97 while, simultaneously, the piston 98 descends to open the valve 99 on the right hand side of distributor $D_1$. The pressure fluid then passes from port P of distributor $D_1$ through pipe 102 into the lower chamber 100 of cylinder M, while the upper chamber 101 of the latter is connected with the outlet E through pipe 103, inner passage 104 on the right hand side of distributor $D_1$ and valve 99. The piston of cylinder M will consequently move upwards and lever 63, pivoting about its fulcrum 105, will act on operating link 67 and lever 69 tending to restore the pilot distributor $d_1$ to its closed position. However, during the preceding upward displacement of the piston 73 of jack $V_1$, the arm 80 on stem 70 has moved upwards closing valve 86 and compressing spring 81, and as the control rod 62 continues its upward movement at a constant speed, this spring 81, after a certain interval, acts on knob 84 to move piston 83 downwards, thus reopening valve 86 and increasing the opening of valve 96 of distributor $D_1$ to cause a supplemental upward displacement of piston 73. Consequently, the delay or dephasing between control member 62, and operation of jack $V_1$ is suppressed for a position of the distributor $D_1$ corresponding to the displacement speed of these two members.

In the embodiment of the invention according to Fig. 6, the controlled member is represented, as in Fig. 4, by a hydraulic motor M and the control or reference member by a hand wheel 1, which serves to turn a shaft carrying a worm 2 meshing with a worm wheel 3 secured to the rotor shaft of motor M. When control member 1 is turned through a given angle, the operating member 110 is displaced with a translatory movement, and the ensuing rotation of the motor M restores the operating member 110, moving it in the direction opposite to that in which it has just been displaced by the operation of control member 1.

In the example shown, the system includes a main distributor $D_2$ and a pilot distributor $d_2$. The body 111 of the pilot distributor is connected by means of a link 112 to one end 113 of a lever 114 rotatable about a fixed fulcrum O and having its other end 115 articulated to the operating member 110. The system is fed with pressure fluid at P and spent pressure fluid is exhausted at E. The main distributor $D_2$ is articulated, in its turn, to a fixed fulcrum O'.

Assuming that member 1 is turned to displace the operating member 110 upwardly, the right hand end 115 of lever 114 will move upwards and, therefore, the body 111 of the distributor $d_2$ will be moved downwards. Thus, pressure fluid is admitted in P to the pilot distributor $d_2$, and, from there, it passes through a pipe 116 to the left hand face of a piston 117 of main distributor $D_2$. The right hand face of a piston 118 of this distributor, rigidly connected with piston 117 by the rod 119, is placed under constant pressure by means of a pipe 120 and passages 121 and 122. As the right hand face of piston 118 is smaller than the left hand face of piston 117, the admission of pressure fluid to chamber 123 causes a displacement of the piston assembly 117, 118 from the left to the right. Piston 118 uncovers passage 124, and the pressure fluid supplied through a pipe 120 is led, by means of a pipe 125, to the lower side of motor M. Simultaneously, the pressure existing in the intermediary chamber 126 of the distributor $d_2$ acts on the right hand face of a piston 127 to displace the piston set 127, 128, 129 from the right to the left against the force of a spring 130, thus connecting the upper side of the motor M to the outlet E through a pipe 131, upper chamber 132 of the distributor $D_2$ and pipe 133. During this time, the displacement of the piston rod 119 from the right to the left displaces the cylinder 134 of a small jack, the piston 136 of which is carried by a stem 135 forming a prolongation of piston 137 of the pilot distributor $d_2$. An arm 138, projecting from the upper end of stem 135, thus compresses a spring 139. This spring 139 tends to restore the arm and stem 135 to their balance positions after a delay caused by the presence of a passage 140 with reduced cross-section between piston 136 and cylinder 134 retarding the flow of the oil filling the cylinder 134 from one side of the piston 136 to the other side thereof. The restoring movement of stem 135 takes place counter-clockwise about fulcrum O, and causes lever 114 in its turn to pivot about point 115 so as to push the body 111 of the pilot distributor $d_2$ further downwards. This increases the opening through which the pressure fluid is admitted to the main distributor $D_2$ and, consequently, effects a supplemental displacement of motor M which restores members 2 and 3 to phase coincidence, not for the closing position of the main distributor $D_2$, but for its position insuring the displacement of motor M at the displacement speed of control member 1.

If the control member 1 is turned to displace the operating member 110 downwards, the body 111 of the pilot distributor $d_2$ is displaced upwardly and the pipe 116 is connected with the outlet. The pressure acting on the right hand face of piston 118 will therefore displace the piston set 117, 118, 119 from the right to the left, thus connecting the lower side of the motor M with the outlet E by means of a pipe 141, while the upper side of the motor M is connected to the source of pressure fluid by the displacement from the left to the right of the piston set 127, 128, 129 under the action of spring 130. In this case, the pressure fluid passes from pipe 120 through chamber 132 and, hence, through pipe 131. The displacement of piston rod 119 towards the left spring 139a and, subsequently, stem 135, is restored clockwise, increasing the outlet opening of distributor $d_2$ and, consequently, decreasing the pressure in chamber 123 of the distributor $D_2$ to produce a corresponding supplemental displacement of motor M.

It should be noted that in the distributor $D_2$ according to Fig. 6, the entire pressure of the source is utilized, since the pressure on one side of the motor and the counter-pressure on the other side of the motor are always determined by the torque so that, for instance, if the pressure of the source is 200 kg./cm.² and if the torque resistance of the motor corresponds to a pressure difference of 200 kg./cm.², the motor will receive on one side a pressure of 200 kg./cm.², while its other side will receive no pressure. If, on the other hand, the torque corresponds to a smaller pressure difference, the supply pressure is reduced and the counter-pressure increased so that, for instance, a pressure of 150 kg./cm.² is obtained on one side of the motor and a pressure of 50 kg./cm.² on the other side, and so on. In order to obtain this result, spring 130 is calculated and the diameters of the pistons 127 and 129 are chosen in such a way that the sum of the pressure acting on the right face of piston 127 and corresponding to the pressure on one side of the motor, plus the pressure on the right face of piston 129 (acting on a surface equal to the difference of the sections of pistons 129 and 127) and corresponding to the pressure on the other side of the motor, is always equal to the total pressure of the source. Thus the distributor $D_2$ acts at the same time as an expansion valve, regulating automatically the counter-pressure on one of the sides of the motor in dependence upon the pressure on the other side thereof.

It should be understood that such a distributor-expansion valve in itself constitutes an independent feature of the invention regardless of its special application. However, the use of such distributor-expansion valve in a hydraulic follow-up system, and, more particularly in a system including the previously described characteristics of the present invention, offers specific advantages and, therefore, constitutes another feature of this invention.

In the preceding examples, the delay or dephasing between the control member and the controlled member is suppressed for a constant speed of displacement of the said members. However, as already mentioned in the introductory part of the specification, this delay can be suppressed, according to another feature of the invention, not only for any constant speed, but also for any constant acceleration, and also, if desired, for variations of accelerations. Fig. 7 shows diagrammatically an embodiment of the invention in which the delay is suppressed for any given constant acceleration.

Referring first to Fig. 7, 230 is an operating rod assumed to be connected with the control member and with the controlled member in order to govern follow-up movement in the described manner. Rod 230 acts simultaneously on the main distributor $D_5$, a first pilot distributor $d_5$, and a second pilot distributor $d_6$, respectively, by means of levers 231, 232 and 233. Any displacement of rod 230 thus determines a displacement of the movable member of the main distributor $D_5$, this latter being, for instance, of the type without backlash described above with reference to Fig. 4. The opening of distributor $D_5$ causes a corresponding displacement of the controlled member which, in its turn, tends to restore the operating rod 230 to its neutral position. However, during this time, rod 230 has also caused a displacement of the movable member of the first pilot distributor $d_5$ in the manner described with reference to Fig. 4. This displacement actuates a jack 234, the piston 235 of which slides slowly, because of the throttle orifice 236 provided in its feed line. The movement of piston 235 displaces the fulcrum 237 of lever 231, thereby increasing the opening of distributor $d_5$ and effecting a supplemental displacement of the controlled member which tends to restore the control member and the controlled member to phase coincidence, not for the closing position of main distributor $D_5$, but for a position thereof corresponding to the given speed of displacement of the control member and the controlled member. The operation of this system as described so far, is the same as that of the system according to Fig. 4. However, in the embodiment according to Fig. 9, the displacement of rod 230 produces additionally a displacement of lever 233, which controls the movable member of the second pilot distributor $d_6$ and, through the latter, a second slow acting jack 238 fed with pressure fluid through a throttle orifice 239. The piston 240 of jack 238, by its displacement, determines a displacement of the fulcrum 241 of lever 232. This causes a supplemental opening of the first pilot distributor $d_5$, which, in turn, produces a supplemental displacement of the piston 235 and, therefore, of the fulcrum 237 of lever 231. The result is a further supplemental opening of the main distributor $D_5$, which produces a further supplemental displacement of the controlled member, this latter being restored to phase coincidence with the control member for the closing position of the auxiliary distributor $d_6$ corresponding to a given constant opening of the auxiliary distributor $d_5$ and to a given constant increase in the opening of the main distributor $D_5$. The delay is thus suppressed, not only for any given constant speed, but also for any given constant acceleration.

In the embodiments of the invention described so far, the member controlling the supply of pressure fluid to the controlled member is constituted by a distributor, the pressure fluid being supplied by any suitable source.

In the embodiment of the invention according to Fig. 8, on the other hand, the member controlling the feeding of the hydraulic motor is a variable flow rate pump. Moreover, Fig. 8 illustrates, by way of example, a remote control mechanism acting through a synchro-differential reactive to a member connected with the motor.

In Fig. 8, the reference numeral 271 denotes a tele-rotator or selsyn transmitter of the control set acting electrically on a synchro-differential or selsyn differential represented by 272. The synchro-differential 272 reacts electrically to the operation of a tele-rotator or selsyn transmitter 273 connected with a worm 274 which meshes with a worm gear secured to the rotor shaft of motor M. 275 is a variable flow rate pump having a flow rate control device including the piston 276 of a cylinder 277. The movable member of the synchro-differential is connected with a lever 278 pivoted to a fixed fulcrum 279 and controlling on the one hand the piston 280 of a cylinder 281, and, on the other hand, the movable member of a distributor without backlash 282. The pressure acting on the opposite ends of the distributor 282 is balanced by an equalizing pipe 283 in order to reduce the resistance to the displacement of the movable member to a minimum.

The device according to Fig. 8 operates as follows:

If a control impulse is sent from the selsyn transmitter 271 to the synchro-differential 272, causing a displacement of lever 278 from the right to the left, the piston 280 of cylinder 281 is also displaced from the right to the left and the pressure fluid, flowing through pipe 284 displaces the piston 276 of cylinder 277 and determines a fixed flow rate of pump 275 which, in its turn, acts on motor M. The rotation of the rotor of this motor drives the worm 274 and tends to restore the synchro-differential to its zero position. However, during this time, the movable member 282 of the distributor without backlash has been moved from the right to the left and the pressure fluid admitted at P acts with a fixed delay, due to the throttle orifice 285, on piston 276 imparting thereto a supplemental displacement so as to increase the flow rate of the pump which, in turn, determines a supplemental displacement in the same direction of the rotor of motor M. As a result, the delay or dephasing between the motor and the control member is suppressed not for the position of the flow rate control device of the pump corresponding to no flow, but for a position of the control device determining a flow rate corresponding to the constant speed of displacement of the control member and the controlled member, this position corresponding to the closed position of the distributor without backlash.

If, on the other hand, the lever 278 is displaced from the left to the right, the same operation will take place in the opposite direction, the piston 276 being, in this case, moved from the left toward the right by the spring 286.

It will be understood that the invention is not intended to be limited by the examples given or by the appended drawings, and that the various arrangements described may be modified in numerous details without departing from the scope of the invention as defined by the following claims.

We claim:

1. In a hydraulic follow-up system, the combination with a displaceable controlling element, a displaceable controlled element, a liquid pressure responsive servomotor connected to said elements to move said controlled element in positional correspondence with displacements of said controlling element, a duct adapted to be connected to a source of pressure liquid, said duct being connected to said servomotor for operation thereof, said main valve means connected to said duct to control the flow of pressure liquid to said servomotor, said main valve means being connected for control by said elements to cause operation of said servomotor in accordance with the amount of positional disagreement between said controlling and controlled elements, of liquid pressure responsive main adjusting means for said main valve means, auxiliary valve means for controlling the flow of pressure liquid to said main adjusting means and having a valve operating member connected to said controlling element and to said controlled element whereby movement of said controlling element will determine an initial flow rate through said auxiliary valve means and thereby cause an initial adjustment of said main valve means in accordance with said positional disagreement, auxiliary adjusting means operatively associated with said main adjusting means and with said auxiliary valve means so as to adjust the latter in response to said initial adjustment of the main valve means to a position in which said initial flow rate through said auxiliary valve means, and consequently the speed of displacement of said controlled element, is increased in order to minimize any lag of said controlled element with respect to said controlling element due to said positional disagreement, and means arranged for yieldingly opposing motion of said auxiliary adjusting means and tending to restore the latter to neutral position with a predetermined delay corresponding to reduction of said lag to zero so as to maintain a flow rate through said main valve means with said lag reduced to zero which corresponds to the speed of displacement of said controlling element.

2. A hydraulic follow-up system according to claim 1, in which said auxiliary adjusting means are constituted by a piston member slidably mounted in a liquid containing cylinder carried by said main adjusting means, and in which said means for yieldingly opposing motion of said piston and tending to restore the latter to its neutral position with a predetermined delay are constituted by spring means arranged to normally hold said piston in the neutral position and by a calibrated flow resistance passage permitting displacement of the liquid in said cylinder from one side of said piston to the other with consequent damping, whereby movement of said cylinder relative to said piston is resisted by liquid flow resistance so as to urge said piston against the force of said spring means from its neutral position to thereby increase said initial speed of the controlled element, whereafter said spring means will move said piston relative to said cylinder towards its neutral position with said predetermined delay due to said liquid flow resistance.

References Cited in the file of this patent

UNITED STATES PATENTS

| | | |
|---|---|---|
| 1,530,445 | Warren | Mar. 17, 1925 |
| 2,167,328 | Beggs | July 25, 1939 |
| 2,310,100 | Losey | Feb. 2, 1943 |
| 2,414,690 | Edwards | Jan. 21, 1947 |
| 2,418,129 | Larson | Apr. 1, 1947 |
| 2,440,687 | Ingoldby | May 4, 1948 |
| 2,503,447 | May | Apr. 11, 1950 |